Sept. 25, 1951 L. M. BARTON 2,569,279

SINGLE SIDE BAND MODULATOR

Filed Nov. 26, 1949 2 Sheets-Sheet 1

Inventor:
Leon M. Barton,
by Morton D. Morse
His Attorney.

Sept. 25, 1951 L. M. BARTON 2,569,279

SINGLE SIDE BAND MODULATOR

Filed Nov. 26, 1949 2 Sheets-Sheet 2

Inventor:
Leon M. Barton,
by Merton D. Morse
His Attorney.

Patented Sept. 25, 1951 2,569,279

UNITED STATES PATENT OFFICE 2,569,279

SINGLE SIDE BAND MODULATOR

Leon M. Barton, Syracuse, N. Y., assignor to General Electric Company, a corporation of New York Application November 26, 1949, Serial No. 129,677

4 Claims. (Cl. 332—45)

Figure 1:
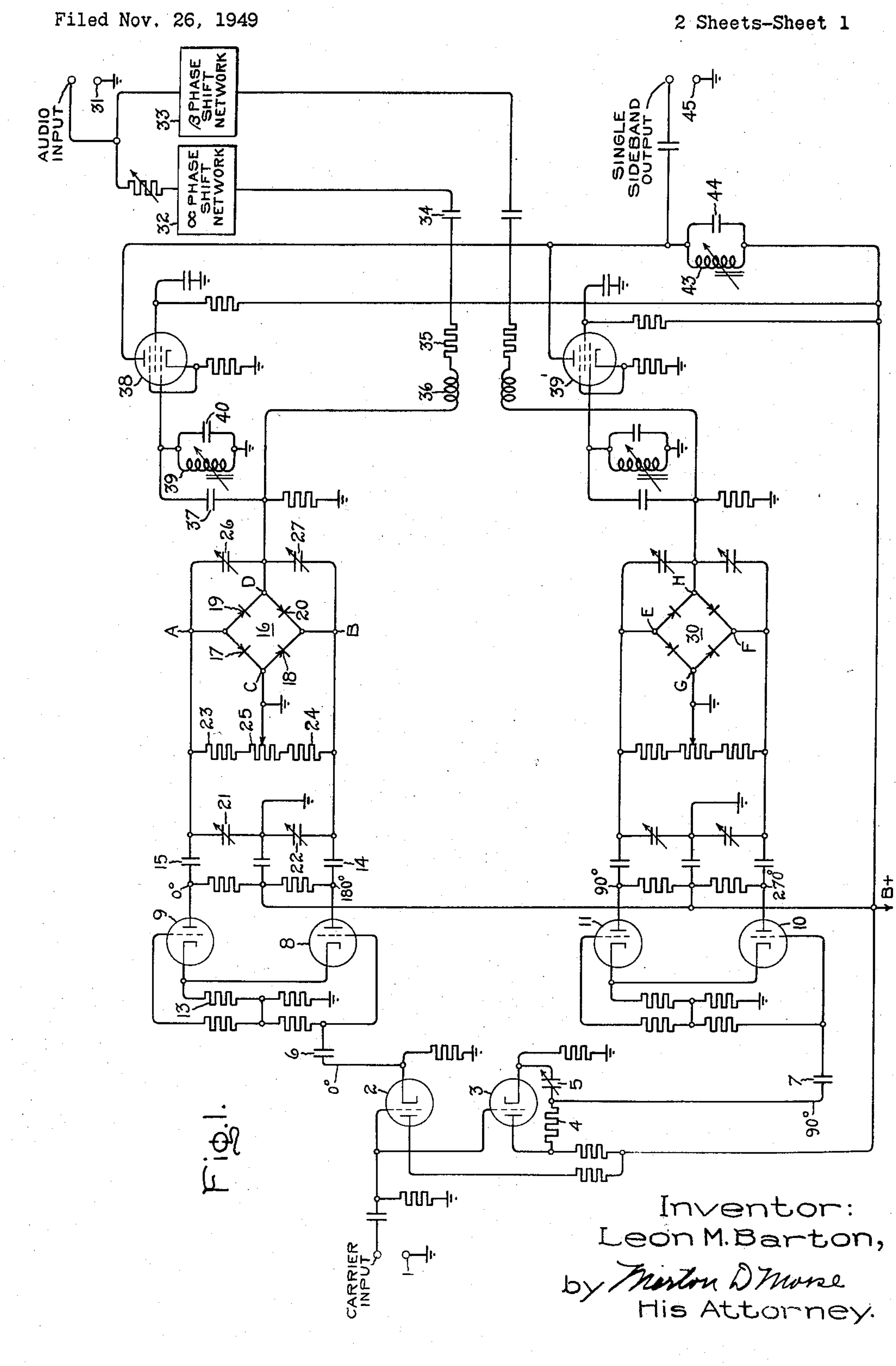

This invention relates generally to single side-band modulating systems and more particularly to a circuit for effecting single side-band modulation of a carrier wave by an audio signal.

The well known process of amplitude modulation of a carrier wave by a modulating signal, such as is utilized, for instance, in commercial radio broadcasting stations, can be expressed mathematically as follows:

$$E \sin wt\,[1+M \sin pt]=E \sin wt+\frac{EM}{2}[\cos\,(w-p)t-\cos\,(w+p)t] \quad \text{(I)}$$

where:

E is the magnitude of the carrier wave,
$w$ is $2\pi$ times the frequency of the carrier wave,
$p$ is $2\pi$ times the frequency of the modulating signal,
M is the modulation factor, normally less than 1, and
$t$ represents time in suitable units.

The amplitude modulation process represented by Equation I gives rise to two side-bands, symmetrically located about the carrier wave. The frequencies of these two side-bands are $$\frac{w-p}{2\pi}$$

for the lower side-band; and $$\frac{w+p}{2\pi}$$

for the upper side-band, respectively.

Another modulation process can be performed with the same modulating signal, displaced by 90 electrical degrees, operating on a carrier wave also displaced by 90 electrical degrees from that used in the first process. Since the terms sin $wt$ and sin $pt$ are used to represent the voltages involved in the first modulation process, the terms cos $wt$ and cos $pt$ represent the same voltages displaced by 90 electrical degrees. The modulation process may now be expressed mathematically as follows:

$$E \cos wt[1+M \cos pt]=E \cos wt+\frac{EM}{2}[\cos\,(w-p)t+\cos\,(w+p)t] \quad \text{(II)}$$

where the symbols used have the same significance as in Equation I.

This second modulation process also produces two side-band frequencies, $$\frac{w-p}{2\pi} \text{ and } \frac{w+p}{2\pi}$$

but the alegbraic sign proceding the term representing the upper side-band in this modulation process is positive, whereas it is negative in the first modulation process. The terms representing the lower side-bands are preceded by similar algebraic signs in both processes. Accordingly, the output of the two modulation processes can be added together to eliminate the upper side-band, or subtracted to eliminate the lower side-band. Thus adding Equations I and II together, gives the following:

$$\sqrt{2}E \sin\,(wt+45°)+\frac{EM}{1}[\cos\,(w-p)t] \quad \text{(III)}$$

Subtracting Equation II from I produces the following:

$$\sqrt{2}E \sin\,(wt-45°)+\frac{EM}{1}[\cos\,(w+p)t] \quad \text{(IV)}$$

The signal represented by Equation III or IV consists only of carrier frequency $$\frac{w}{2\pi}$$

and the single side-bands $$\frac{w-p}{2\pi} \text{ or } \frac{w+p}{2\pi}$$

respectively. If, instead of the process of ordinary amplitude modulation which has been described, a balanced modulation process is utilized, the carrier frequency is eliminated from the output signals expressed by Equations I and II. Addition or subtraction then results in the upper side band $$\frac{w+p}{2\pi}$$

alone, or in the lower side band $$\frac{w-p}{2\pi}$$

alone, respectively.

In the co-pending application #785,259 of Donald E. Norgaard, filed November 3, 1947, entitled Selective Side-Band Transmission and Reception System, and assigned to the same assignee as the present invention, there is described a system for producing single side-band modulation which utilizes a pair of tube modulators. I have found that a pair of bridge crystal modulators may be used for the same purpose with numerous advantages.

Accordingly, it is an object of my invention to provide a new and improved single side-band generator, Another object of my invention is to provide a new and improved balanced modulator utilizing bridge circuits in the production of a single sideband output.

For further objects and advantages and for a better understanding of my invention, attention is now directed to the following description and accompanying drawings. The features of my invention believed to be novel are more particularly pointed out in the appended claims.

In the drawings:

Fig. 1 is a schematic diagram of a single sideband generator embodying my invention.

Figure 2:
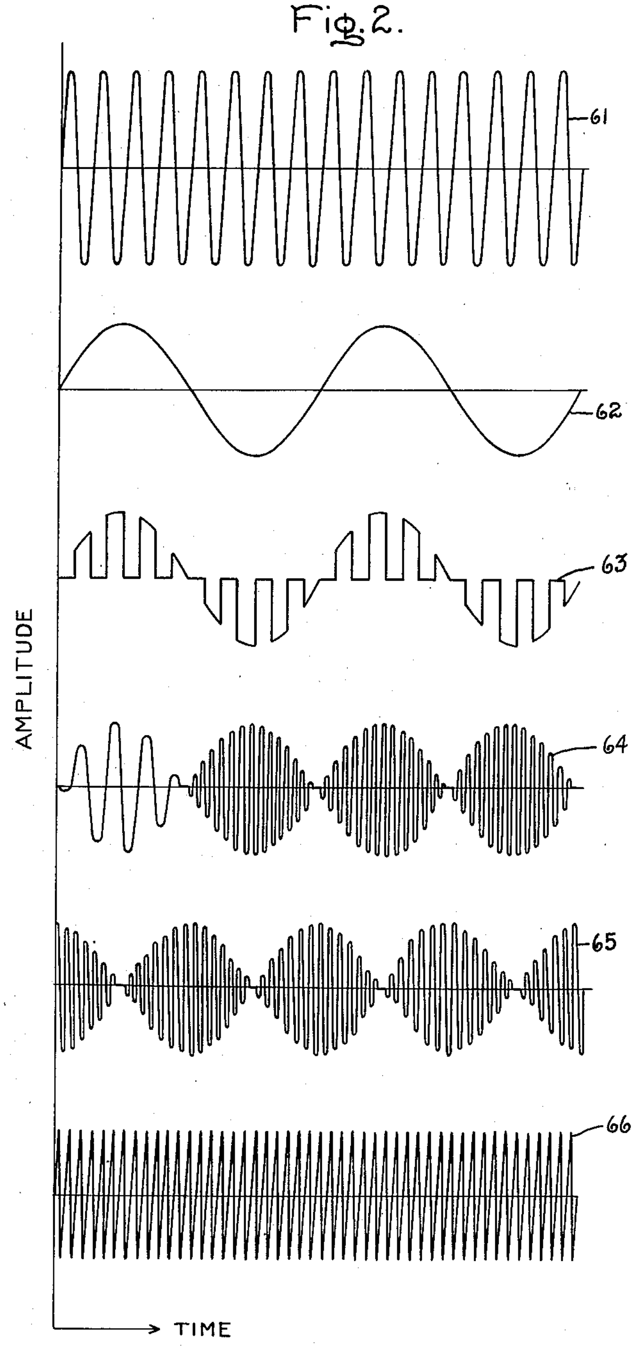

Fig. 2 contains a number of curves illustrating the operating characteristics of the circuit of Fig. 1.

Referring to Fig. 1, an input terminal is adapted to receive a carrier wave such as illustrated by curve 61 of Fig. 2. The carrier wave is of a relatively high frequency with respect to the intended modulating frequencies. Input terminal 1 is coupled to the control electrodes or grids of a pair of triode tubes 2 and 3 which are supplied with operating potential from a source indicated by B+. Tubes 2 and 3 operate as cathode coupled amplifiers to provide a suitable impedance conversion in supplying the carrier wave to the succeeding stages. Triode tube 3, in addition to operating as an impedance converter, serves also to introduce a 90 degree phase shift in the carrier wave available at its output terminal. This is provided by means of a resistor 4 and an adjustable capacitor 5 coupled between its anode and its cathode. Since there is a 180 degree phase difference between the signal at the anode and at the cathode, it is possible, by suitable choice of the resistor 4 and the capacitor 5, to provide a signal of any desired intermediate phase. By selecting capacitor 5 so that its reactance at the carrier wave frequency is equal to the resistance of resistor 4, the signal available at capacitor 7 is advanced in phase by 90 degrees over that available at capacitor 6.

A pair of triode tubes 8 and 9 operate as a paraphase amplifier for the carrier wave supplied through capacitor 6, and triode tubes 10 and 11 perform a similar function for the carrier wave supplied through capacitor 7. The carrier wave is supplied to the control electrodes of tubes 8 and 10 at 0° and 90° relative phase respectively. Since tubes 8 and 9 have a common cathode impedance constituted by resistor 13, the carrier wave occurs at the control electrode of tube 9 with a 180 degree phase reversal, in accordance with principles well known in the art. Tubes 10 and 11 operate similarly, and likewise provide a 180 degree phase reversal between the signals at their respective control electrodes. Thus the carrier wave occurs at the anodes of the tubes 9 and 8 with respective phases of 0° and 180°, and at the anodes of tubes 11 and 10 with respective phases of 90° and 270°.

The signals at the anodes of tubes 8 and 9 are coupled through capacitors 14 and 15 to a pair of conjugate points, A and B, of a bridge modulator 16 constituted by four rectifiers 17, 18, 19, and 20. A pair of adjustable capacitors 21 and 22, connect points A and B to ground respectively. Also resistors 23 and 24 connect points A and B respectively, to opposite terminals of a potentiometer 25 whose adjustable tap is connected to ground. Capacitors 21 and 22, and also potentiometer 25, are adjusted so that the carrier wave voltages at points A and B are of equal amplitude and have a 180° phase difference.

The four rectifiers comprised in bridge modulator 16 form a pair of unilaterally conducting paths between points A and B. The junction point C of rectifiers 17 and 18 forming one path is connected to ground, whereas the junction point D of rectifiers 19 and 20 forming the other path serves as an output terminal. Junction point D is also connected to points A and B through adjustable capacitors 26 and 27 whose function will be explained presently. The rectifiers constituting modulator 16 may consist of diode rectifying devices such as are well known in the art. In practice, however, I have found that germanium crystal rectifiers serve the purpose very well and are more convenient and compact than standard diode tubes. In addition they have the advantage of much lower capacitance between electrodes and between electrodes and ground.

A similar circuit comprising bridge modulator 30 operates with the paraphase amplifier constituted by tubes 10 and 11. Since the component parts are in every way identical with those of bridge modulator 16, they will not be described in detail. Points E, F, G, and H in modulator 30, correspond respectively to points A, B, C and D in modulator 16.

The modulating signal is supplied to an audio input terminal 31 which is connected to a pair of phase shift networks 32 and 33, which have been designated $\alpha$ and $\beta$ respectively. The $\alpha$ and $\beta$ phase shift networks introduce a constant phase difference of 90° between the audio signals at their output terminals. Such phase shift networks are described in the copending application No. 662,665, of Robert B. Dome, entitled "Phase Shift System," filed April 17, 1946, now patent No. 2,566,876 granted September 4, 1951, and assigned to the same assignee as the present invention. The $\alpha$ and $\beta$ phase shift networks have the property of shifting the phase of the two derived voltages at their output terminals, with respect to the voltage supplied to their input terminal, so that the phase difference between the derived voltages is maintained substantially constant at 90° as the input voltage is varied over a wide range of frequencies. In practice, each of the derived output voltages is subject to a phase shift, with respect to the input voltage, whose magnitude is a logarithmic function of frequency. However, it is possible to so proportion the circuit constants in both networks that a constant phase difference is maintained between the two derived output voltages. In the present invention this phase shift is made 90 degrees. The fact that there is a total phase shift which varies with frequency is immaterial, and the important factor is that the output of the $\alpha$ network 32 has a constant 90° phase difference with respect to the output of the $\beta$ network 33. The output voltage from network 32 may be represented by curve 62 of Fig. 2 and the output voltage from network 33 may be represented by a similar curve shifted in phase by 90°. The output voltage from network 32 is coupled through capacitor 34, resistor 35 and radio frequency choke 36 to point D of modulator 16. Modulator 16 operates as a balanced modulator such that no voltage of the carrier wave frequency occurs at point D when the modulator is suitably adjusted. Capacitors 26 and 27 are used to make the fine adjustments on the modulator in balancing out the carrier voltage.

If the carrier wave voltage is represented by a function of the type sin $wt$, and if the modulating voltage is represented by a function of the type sin $pt$, then the output voltage at terminal D is:

$$\cos (w-p)t - \cos (w+p)t \qquad (V)$$

The operation of modulator 16 may be explained as follows. Whenever the polarity of the carrier wave voltage is such as to permit conduction from point A to point D, a low impedance path is effectively constituted between points D and C. On the other hand when the polarity of the carrier wave voltage is such that no current passes through the crystal rectifiers, the impedance between points D and C is very high. In other words, the impedance in one case is approximately equal to the positive current impedance of one crystal which is practically a short circuit, and in the other case, it is approximately equal to the reverse current impedance of one crystal, which is practically an open circuit. The effect of impressing the carrier wave voltage across points A and B is then to effectively short circuit points D and C at intervals corresponding to the positive half cycles of the carrier wave. As a result, the modulating voltage which is supplied to point D is effectively broken up into a series of pulses having the frequency of the carrier wave, and the amplitude of the pulses varies in accordance with the modulating voltage. This is represented by curve 63 of Fig. 2.

The carrier wave frequency is normally much higher than that of the modulating frequency, but, for purposes of illustration, a lower ratio of carrier to modulating frequency has been shown. In practice, however, the pulses of voltage and the carrier wave frequency could hardly be represented to the scale shown in curve 63 of Fig. 2. Curve 63 actually contains a low frequency component equivalent to the modulating frequency, which causes the pulses of voltage to occur above and below the zero line alternately. Curve 63 also contains high frequency components corresponding to the rectangular shape of the pulses of carrier voltage. The low frequency components corresponding to the modulating frequency are removed by means of coupling capacitor 37 which connects point D to the control electrode of a pentode tube 38, and prevents inductance 39 from short-circuiting the modulating voltage at point D. The high frequency components are removed by means of a circuit comprising inductance 39 and a capacitor 40, which are connected in parallel between the control electrode of tube 38 and ground. This circuit is resonant at the frequency of the carrier wave so that higher frequency harmonics are shunted to ground by capacitor 40. The wave-form of the voltage supplied to the control electrode of tube 38 may be represented by curve 64 of Fig. 2 and this corresponds to a voltage of the form:

$$\cos (w-p)t - \cos (w+p)t$$

The first cycle of curve 64 has been drawn to the same frequency scale as shown in curve 63, whereas the remaining cycles are drawn to a frequency scale such as would be used in practice.

The network 33 is connected to point H of modulator 30. A similar modulation process occurs therein, so that the control electrode of pentode tube 39 is supplied with like modulation products resulting from the carrier wave shifted 90°, and the modulating wave shifted 90° from those supplied to modulator 16. The signal at the control electrode of tube 39 may be represented by curve 65 of Fig. 2 and corresponds to a signal of the form:

$$\cos (w-p)t + \cos (w+p)t \qquad (VI)$$

Thus the signal supplied to the control electrodes of tubes 38 and 39′ contain both side-bands. However, the upper side-band term occurs with a negative sign preceding it at tube 38, whereas it occurs with a positive sign preceding it at tube 39′. Both tubes 38 and 39′ have a common output impedance constituted by an inductance 43 and a capacitor 44 which form a resonant circuit at the lower side-band frequency. As a result, the upper side-band cancels out, and only the lower side-band occurs at output terminal 45. The wave-form of the lower side-band is illustrated by curve 66 of Fig. 2 and may be represented mathematically by the function $\cos (w-p)t$.

Although I have shown a circuit for producing the lower side-band, it is quite evident that the circuit may likewise be employed for producing the upper side-band. This may conveniently be achieved by reversing the connections from tubes 10 and 11 to terminals E and F of modulator 30. Thus by connecting the anode of tube 10 to modulator terminal E and the anode of tube 11 to modulator terminal F, the upper and lower side-bands in the output of the modulator will be reversed, so that both will occur with negative signs preceding them in the mathematical equation representative thereof. As a result the lower side-bands will cancel out in the output of tubes 38 and 39′, and the upper side band of the form $\cos (w+p)t$ will occur at output terminal 45.

I have also found that it is possible to achieve a balanced moduation with one pair of crystal rectifiers per modulator only. Thus crystals 17 and 18 in modulator 16 may be replaced by equal resistances, and likewise for the corresponding crystals in modulator 30.

My invention has the advantage over similar side-band generators using vacuum tube modulators, that a much more accurate balance may be maintained in bridge type modulators such as I have employed. In practical construction of a single side-band generator embodying my invention, I have found that the ratio of the rejected side-band and suppressed carrier to the desired side-band exceeds 40 decibels, and remains constant over long periods of operation. In the case of certain vacuum tube modulators, it has been observed that considerable drift in the balance point occurred during operation and necessitated continuous readjustment; this difficulty is eliminated by my invention.

While a specific embodiment has been shown and described, it will, of course, be understood that various modifications may be made without departing from the invention. The appended claims are accordingly, intended to cover any such modifications falling within the true spirit and scope of the invention.

What I claim as new and desire to secure by Letters Patent of the United States is:

1. A single side band generator comprising a source of carrier wave voltage, means for producing from said carrier voltage a derived voltage in quadrature phase, a source of modulating voltage, a pair of phase shift networks for producing two derived modulating voltages having a constant phase difference of 90°, a pair of bridge modulators, each of said modulators comprising two pairs of unidirectional conducting devices connected to form two similarly poled, parallel conducting paths between a first pair of conjugate points, the junctions in the pair of devices in each path forming a second pair of conjugate points, said carrier voltage being applied across one pair of said conjugate points of one modulator, and said carrier voltage of quadrature phase being applied to one pair of said conjugate points of said other modulator, said derived modulating voltages being applied across respective other pairs of said conjugate points of said modulators, means for connecting one point of each of said other pairs of conjugate points to a source of common reference potential, and means connected to the other point of each of said other pairs of conjugate points for combining the modulation products from said alternate conjugate points.

2. A single side band generator comprising a source of carrier wave voltage, means for producing from said carrier voltage, derived voltages having relative phases of 0°, 90°, 180°, and 270°, a source of modulating voltage, a pair of phase shift networks for producing, from said modulating voltage, a pair of derived modulating voltages having a constant phase difference of 90°, a pair of bridge modulators, each of said modulators comprising four rectifiers connected in pairs to form two parallel conducting paths between one pair of conjugate points, the junction of the two rectifiers in each path forming an alternate pair of conjugate points, said derived carrier voltages of 0° and 180° relative phase being applied to said one pair of conjugate points of one modulator, and said derived carrier voltages of 90° and 270° relative phase being applied to said one pair of conjugate points of said other modulator, one of the alternate conjugate points in each modulator being connected to a common point, and the other alternate conjugate points being connected to respective ones of said phase shift networks, and means for algebraically combining the modulation products at both said other alternate conjugate points.

3. A single side band generator comprising a source of carrier wave voltage, means for producing from said wave derived voltages of equal amplitudes and having relative phase angles 0°, 90°, 180° and 270° respectively, a source of modulating voltgae, a pair of phase shift networks for deriving from said modulating voltage, a pair of modulating voltages having a constant 90° phase difference, a pair of bridge modulators, each of said modulators comprising four unidirectional conducting devices, said devices being connected in pairs to form a pair of parallel unidirectional conducting paths between one pair of conjugate points, said derived carrier voltages being applied to said conjugate points, of relative phase 0° and 180° in one of said modulators, and of relative phase 90° and 270° in the other of said modulators, said derived modulating voltages being applied between the junction points of said devices in said paths of a respective one of said modulators, whereby modulation products occur at said junction points of each modulator containing upper and lower side-band components so that the components of one side-band are of like polarity at each of said junction points whereas the components of the opposite side-band are of opposing polarity at each of said junction points, and a mixing circuit connected to said junction points for algebraically combining said modulation side-band components to cancel out the components forming one side band and retain the components forming the other side band.

4. A single side band generator comprising a source of carrier wave voltage, a phase shift network and a pair of paraphase amplifiers for producing, from said wave, carrier voltages of equal amplitudes and having relative phase angles of 0°, 90°, 180° and 270° respectively, a source of modulating voltage, a pair of phase shift networks for deriving from said modulating voltage, a pair of modulating voltages having a constant 90° phase difference, a pair of bridge modulators, each of said modulators comprising four crystal rectifiers, said rectifiers being paired into two groups and said groups connected in series to form a pair of parallel unidirectional conducting paths between one pair of conjugate points, the junction points of said rectifiers in said paths forming pairs of alternate conjugate points of which one is grounded and the other provides a terminal, said produced carrier voltages of relative phase 0° and 180° being applied to respective ones of said one pair of conjugate points in one of said modulators and said produced carrier waves of relative phase 90° and 270° being applied to respective ones of said one pair of conjugate points in said other modulator, said derived modulating voltages being applied to respective terminals of said modulators, whereby modulation products occur at said terminals of each modulator containing upper and lower side-band components, so that the components of one side-band are of like polarity at each of said modulator terminals whereas the components of the opposite side-band are of opposing polarity at each of said modulator terminals, and a mixing circuit connected to said terminals for algebraically combining said modulation side band components to cancel out components forming one side band and retain only components forming the other side band.

LEON M. BARTON.

REFERENCES CITED

The following references are of record in the file of this patent:

UNITED STATES PATENTS

| Number | Name | Date |
|---|---|---|
| 2,476,880 | Lenehan | July 19, 1949 |